G. I. BROWNE.
RUBBER SPRING.
APPLICATION FILED NOV. 7, 1919.

1,369,389.

Patented Feb. 22, 1921.

Inventor:
George I. Browne
by his attorneys

UNITED STATES PATENT OFFICE.

GEORGE I. BROWNE, OF LANCASTER, PENNSYLVANIA.

RUBBER SPRING.

1,369,389.     Specification of Letters Patent.     Patented Feb. 22, 1921.

Application filed November 7, 1919. Serial No. 336,520.

*To all whom it may concern:*

Be it known that I, GEORGE I. BROWNE, a citizen of the United States, and resident of Lancaster, in the county of Lancaster and State of Pennsylvania, have invented a new and useful Improvement in Rubber Springs, of which the following is a specification.

This invention relates to a rubber spring and has for an object to provide an article of this character which, while composed of rubber, is of such form and shape that it will have to a large degree, the advantageous qualities of a metallic spring.

Another object consists in providing certain improvements in the form, construction and arrangement of the several parts whereby the above named and other objects may be effectively attained.

A practical embodiment of the invention is represented in the accompanying drawings, in which.

Figure 1:
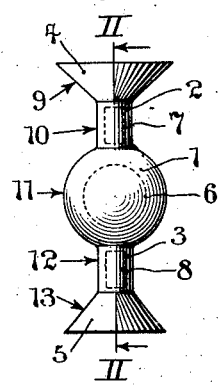
Figure 1 represents an elevation of the article.
Figure 2:
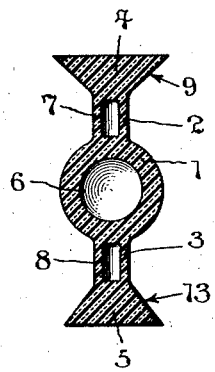
Fig. 2 represents a vertical section taken in the plane of the line II—II of Fig. 1, looking in the direction of the arrows.
Figure 3:
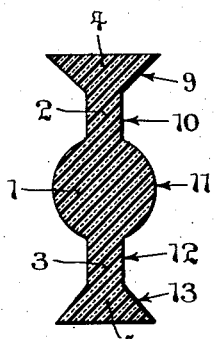
Fig. 3 represents a vertical section of a modified form.

It has, of course, been known for a long time that vulcanized rubber possesses certain qualities of resilience and various forms of vulcanized rubber have been used as cushioning elements. It has also, of course, been known that metal such as steel, may be formed into springs for various purposes. But, rubber springs and metallic springs of known kinds are, to the best of my knowledge, quite different in their action as spring members, and I am not aware that a rubber spring has ever been made which approximates the resilient qualities of a metallic spring. My invention is addressed to the accomplishment of this result.

In embodying my invention I mold, or otherwise appropriately form, a rubber compound into a form that includes, substantially, a sphere 1, a pair of cylinders 2, 3, and a pair of flanges 4, 5 preferably frusto-conical in form; then vulcanize the said article in any usual manner. In the embodiment of my invention, which I consider at the present time to be the best, the spherical portion is disposed centrally, the two cylindrical portions at opposite sides thereof and the flanges at the extremities of the cylindrical portions. I also consider it desirable to make the spherical portion 1 hollow, as indicated at 6, and the cylindrical portions 2, 3, hollow, as indicated at 7, 8, in order to improve the yielding qualities of the article. In some instances, it will be advantageous to make the cylindrical portions 2, 3, very short.

As a result of this formation, the article is provided, according to my theory, with five points at which it will expand when under pressure exerted in an axial direction, these points being indicated by arrows 9, 10, 11, 12 and 13 and being considered as extending throughout the circumference of the article. I believe the said expansion will be most prominent on the spherical and cylindrical parts 1, 2 and 3.

This particular formation resulting in the provision of points of expansion just mentioned, imparts to the article a resiliency which is far in excess of that possessed by an ordinary rubber article of simple geometric form, and enables my spring to be used in the place of and as a substitute for a metallic spring in many applications. It also enables my spring to be used with success under conditions which have ordinarily been considered to require a pneumatic cushion as, for instance, in lieu of the compressed air contained in a pneumatic vehicle tire.

Figure 4:
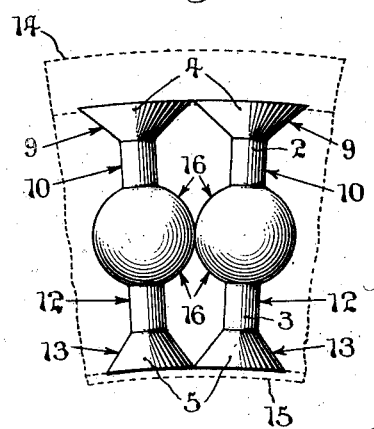
Fig. 4 represents a detail elevation showing one adaptation of the article for use as a resilient element in a vehicle tire.

I have illustrated in Fig. 4, one way in which my springs may be used in lieu of the air in a pneumatic tire. In this figure, the tread portion of the tire is outlined in dots and denoted by 14, while the rim seat is similarly outlined and marked 15. The rubber springs are placed side by side in radial direction and in abutment with each other, and their upper flanges 9 may be suitably secured to the inside of the tread portion of the tire in any desired manner. It will be understood that these rubber springs will be placed throughout the whole extent of the tire.

As a result of this arrangement, when pressure is exerted in a substantially axial direction with respect to certain of the rubber springs (as will be the case during the ordinary motion of the vehicle) the points 9, 10, 11, 12 and 13 will tend to expand but, as the spherical parts 1 are in abutment, the point of expansion 11 will, in fact, be moved upwardly and downwardly, so that the spherical parts will have their most pronounced expansion at the points indicated by the arrows 16. In conjunction with this, the points 9, 10, 12 and 13 will expand as already indicated. In order to enable the rubber springs to be placed in abutment, as indicated in Fig. 4, the flanges 5 are made slightly smaller than the flanges 4, thus compensating for the radial disposition of the springs.

I believe that this rubber spring is, of itself, a new thing, which is adaptable for many purposes and I do not intend by illustrating it in connection with a tire to, in any respect, limit its application to the performance of any particular duty. I also desire it to be understood that various changes may be resorted to in the form, construction and arrangement of the several parts without departing from the spirit and scope of my invention, and hence I do not intend to be limited to the details herein shown and described, except as they are included in the claims.

What I claim is:

1. A rubber spring including in its form substantially, a sphere, a cylinder and a truncated cone, said elements being connected to each other.

2. A rubber spring including in its form substantially, a sphere, a pair of cylinders, and a pair of truncated cones, said elements being connected to each other.

3. A rubber spring including in its form substantially, a sphere, a pair of cylinders, and a pair of truncated cones, with the sphere intermediate the cylinders and the cylinders intermediate the sphere and the cones.

4. A rubber spring including in its form substantially, a sphere, a pair of cylinders, and a pair of truncated cones, with the sphere intermediate the cylinders and the cylinders intermediate the sphere and the cones, said sphere being hollow.

5. A rubber spring including in its form substantially, a sphere, a pair of cylinders, and a pair of truncated cones, with the sphere intermediate the cylinders and the cylinders intermediate the sphere and the cones, said cylinders being hollow.

6. A rubber spring including in its form substantially, a sphere, a pair of cylinders, and a pair of truncated cones, with the sphere intermediate the cylinders and the cylinders intermediate the sphere and the cones, said sphere and said cylinders being hollow.

In testimony that I claim the foregoing as my invention, I have signed my name this third day of November, A. D. 1919.

GEORGE I. BROWNE.